United States Patent
Magnuski

(10) Patent No.: US 7,280,492 B2
(45) Date of Patent: Oct. 9, 2007

(54) VIDEOCONFERENCING SYSTEM

(75) Inventor: Henry S. Magnuski, Palo Alto, CA (US)

(73) Assignee: NCast Corporation, Sunnyvale, CA (US)

( * ) Notice: Subject to any disclaimer, the term of this patent is extended or adjusted under 35 U.S.C. 154(b) by 1111 days.

(21) Appl. No.: 09/788,958

(22) Filed: Feb. 20, 2001

(65) Prior Publication Data
US 2004/0071098 A1    Apr. 15, 2004

Related U.S. Application Data

(60) Provisional application No. 60/183,916, filed on Feb. 22, 2000.

(51) Int. Cl.
*H04L 12/18* (2006.01)

(52) U.S. Cl. ........................ 370/261; 709/204

(58) Field of Classification Search ............ 370/260, 370/261, 263–265, 270, 390, 312, 432, 437, 370/438, 259, 262, 266; 709/204–207; 348/14.08, 348/14.09, 14.1
See application file for complete search history.

(56) References Cited

U.S. PATENT DOCUMENTS

| | | | | |
|---|---|---|---|---|
| 5,392,223 A | * | 2/1995 | Caci | ............................ 709/218 |
| 5,473,367 A | * | 12/1995 | Bales et al. | ............... 348/14.11 |
| 5,615,338 A | * | 3/1997 | Poole et al. | ................. 712/223 |
| 5,703,755 A | * | 12/1997 | Flesher et al. | ............... 361/737 |
| 5,915,091 A | * | 6/1999 | Ludwig et al. | ............. 709/204 |
| 6,011,782 A | * | 1/2000 | DeSimone et al. | ......... 370/260 |
| 6,101,180 A | * | 8/2000 | Donahue et al. | ............ 370/352 |
| 6,128,649 A | * | 10/2000 | Smith et al. | ................ 709/217 |
| 6,331,983 B1 | * | 12/2001 | Haggerty et al. | ........... 370/400 |
| 6,697,341 B1 | * | 2/2004 | Roy | ............................ 370/260 |
| 6,813,714 B1 | | 11/2004 | Hardjono et al. | |
| 6,873,627 B1 | | 3/2005 | Miller et al. | |
| 2002/0054205 A1 | | 5/2002 | Magnuski | |
| 2002/0101997 A1 | * | 8/2002 | Curtis et al. | ................. 380/279 |
| 2004/0080504 A1 | | 4/2004 | Salesky et al. | |
| 2004/0172588 A1 | | 9/2004 | Mattaway | |
| 2004/0252701 A1 | | 12/2004 | Anandakumar et al. | |
| 2005/0100016 A1 | | 5/2005 | Miller et al. | |
| 2005/0169197 A1 | | 8/2005 | Salesky et al. | |
| 2005/0286488 A1 | | 12/2005 | Briscoe et al. | |

* cited by examiner

*Primary Examiner*—Hassan Kizou
*Assistant Examiner*—Brian Roberts
(74) *Attorney, Agent, or Firm*—Kaplan Gilman Gibson & Dernier LLP

(57) ABSTRACT

A multicasting conferencing system is described wherein permanently or temporarily assigned addressing may be used. When permanently assigned multicast addressing is used, several channel parameters are assigned to a multicast session, and any terminals desiring to "tune in" to the multicast session simply invoke those parameters from a storage location at which they have been previously stored.

15 Claims, 6 Drawing Sheets

| Variable | Category | Min | Max | Option A | Option B | Option C | Option D | Option E | Description | Notes |
|---|---|---|---|---|---|---|---|---|---|---|
| Version | number | 1 | 9.9 | 1.0, 1.1, 1.2, etc. | | | | | Channel definition version | Defines the current version of channel parameters |
| Channel | number | 0 | 100 | | | | | | Channel number, 0 = current activity | The numerical channel number. Channel 0 is the currently active channel, 1-100 are entries in the channel table. The number is an index into the table and can be used simply "Tune in Channel 3". |
| Channel ID | text | | | | | | | | Channel ID text | The text symbolically identifying the channel. Channels can be named in any way, by department, function, geographic location and just arbitrary designators, like colors, names of flowers or rocks, etc. |
| Channel Options | hex number | | | 0x0000 | 0x0001 | | | | Channel options: first bit - AutoCoordinator | Activate/deactivate specific options related to this channel, such as auto-coordinate, auto-join, auto-archive, etc. |
| Channel SAP | activity | | | enable | disable | | | | Channel SAP option | This switch triggers Session Announcement Protocol messages, messages which describe the media streams being used in the currently broadcast session. The unit 'Self' announces" the session in which it currently involved. |
| V State | activity | | | enable | disable | | | | Video transmission will be enabled | Enable/disable transmission on the video channel. |
| V Format | format | | | h.261 | h.263 | mjpeg | mpeg | mp21 | Video codec type | Type of video compression/encoding to be used. |
| V BW | selector | 28 | 6000 | 64kbps | 128kbps | ... | 3096kbps | vrate | Video bandwidth selector | Allows selection of several preset values of video bandwidth, or selection of an arbitrary video rate. |
| V Rate | kbps | | | | | | | | Video bandwidth used | The rate, in kbps, desired for video transmission. |
| V FPS | selector | | | 15fps | 30fps | vfps | | | Video frames per second selector | Allows selection of several preset values of frames per second, or selection of an arbitrary frame rate. |
| V FrmSec | fps | 1 | 30 | | | | | | Video frames per second variable rate | Number of video frames per second desired. |
| V Quality | selector | | | low | medium | high | vquality | | Video quality selector | Allows selection of several preset values of video quality, or an arbitrary video quality factor. Controls encoding parameters in the video codec. |
| V Quality Scale | quality | 1 | 100 | | | | | | Video quality factor | Quality of video encoding desired. |
| V Source | address | | | | | | | | Video SSM IP address | The source (headend) IP address required for use with Source-Specific-Multicast protocol. |
| V Address | address | | | | | | | | Video multicast IP address | The multicast or unicast IP address used for the video stream. |
| V Port | port | | | | | | | | Video multicast port | The multicast or unicast IP port used for the video stream. |
| V Scope | scope | | | admin | ttl | | | | Video multicast scope | The type of multicast scoping used. Scope defines the range or boundaries of multicast packet transmission. |
| V TTL | ttl | 1 | 255 | | | | | | Video TTL | The IP protocol "time-to-live" field, defines packet lifetime hop count. |
| V Primary | address | | | | | | | | Video primary media stream IP address | Specifies the IP address of the source media stream which will be rendered on the primary video display. Normally set by the floor control function of the conference control protocol, but can also be manually preset for a given IP address. |
| V Secondary | address | | | | | | | | Video secondary media stream IP address | Specifies the IP address of the source media stream which will be rendered on the secondary video display. Normally set by the floor control function of the conference control protocol, but can also be manually preset for a given IP address. |

FIG. 4A

| Variable | Category | Min | Max | Option A | Option B | Option C | Option D | Option E | Description | Notes |
|---|---|---|---|---|---|---|---|---|---|---|
| A State Input | activity | | | enable | disable | | | | Audio transmission will be enabled | Enable/disable transmission on the audio channel. |
| A State Output | activity | | | enable | disable | | | | Audio reception will be enabled | Enable/disable reception on the audio channel. |
| A Format | format | | | pcm | gsm | dvi | | | Audio codec type | Type of audio compression/encoding to be used. |
| A BW | selector | | | arate | | | | | Audio bandwidth selector | Allows selection of several preset values of video bandwidth, or selection of an arbitrary video rate. |
| A Rate | kbps | 1 | 512 | | | | | | Audio bandwidth used | The rate, in kbps, desired for video transmission. |
| A Channels | number | 1 | 8 | | | | | | Audio channels used | The number of audio channels simultaneously transmitted. The value "1" is for monaural transmission, "2" is for stereo, etc. |
| A ms per pkt | format | | | 20 | 40 | 80 | | | Audio milliseconds/packet | The number of milliseconds of audio samples to be loaded into one packet. The tradeoff is efficiency vs. time delay. |
| A Spkr Phone | activity | | | fullduplex | mikemutesi | netmutesmike | | | Audio speakerphone control | Type of audio input control. Full duplex = simultaneous two-way. Mikemutesnet = microphone has priority over received network audio. Netmutesmike = received network audio has priority over microphone input. |
| A Source | address | | | | | | | | Audio SSM IP address | The source (headend) IP address required for use with Source-Specific-Multicast protocol. |
| A Address | address | | | | | | | | Audio multicast IP address | The multicast or unicast IP address used for the primary audio stream. |
| A Port | port | | | | | | | | Audio multicast port | The multicast or unicast IP port used for the primary audio stream. |
| A SAP Source | address | | | | | | | | Audio Second Audio Program SSM IP address | The source (headend) IP address required for use with Source-Specific-Multicast protocol. |
| A SAP Address | address | | | | | | | | Audio Second Audio Program multicast IP address | The multicast or unicast IP address used for the second audio program stream. |
| A SAP Port | port | | | | | | | | Audio Second Audio Program multicast port | The multicast or unicast IP port used for the second audio program stream. |
| A Scope | scope | | | admin | ttl | | | | Audio multicast scope | The type of multicast scoping used. Scope defines the range or boundaries of multicast packet transmission. |
| A TTL | ttl | 1 | 255 | | | | | | Auto TTL | The IP protocol "time-to-live" field, defines packet lifetime hop count. |
| A Primary | address | | | | | | | | Audio primary media stream IP address | Specifies the IP address of the primary audio stream which will be decoded and sent to the speaker. Normally set by the floor control function of the conference control protocol, but can also be manually preset for a given IP address. |
| A Secondary | address | | | | | | | | Audio secondary media stream IP address | Specifies the IP address of the secondary audio stream which will be decoded and sent to the speaker. Normally set by the floor control function of the conference control protocol, but can also be manually preset for a given IP address. |

FIG. 4B

| Variable | Category | Min | Max | Option A | Option B | Option C | Option D | Option E | Description | Notes |
|---|---|---|---|---|---|---|---|---|---|---|
| G State | activity | | | enable | disable | | | | Graphics transmission will be enabled | Enable/disable transmission on the graphics channel. |
| G Format | format | | | h.261 | h.263 | | | | Graphics codec | Type of graphics compression/encoding to be used. |
| G BW | selector | | | 32kbps | 64kbps | | | | Graphics bandwidth selector | Allows selection of several preset values of graphics bandwidth, or selection of an arbitrary graphics transmission rate. |
| G Rate | kbps | 1 | 1000 | | | | | | Graphics bandwidth used | The rate, in kbps, desired for graphics transmission. |
| G FPM | selector | | | 1fpm | 5fpm | | | | Graphics frames per minute selector | Allows selection of several preset values of frames per second, or selection of an arbitrary frame rate. |
| G Frm Min | fpm | 1 | 60 | | | | | | Graphics frames per minute | Number of graphic frames per minute desired. |
| G Quality | selector | | | low | medium | high | gquality | | Graphics quality selector | Allows selection of several preset values of graphics quality, or an arbitrary graphics quality factor. Controls encoding parameters in the graphics codec. |
| G Quality Scale | quality | 1 | 100 | | | | | | Graphics quality factor | Quality of graphics encoding desired. |
| G Source | address | | | | | | | | Graphics SSM IP address | The source (headend) IP address required for use with Source-Specific-Multicast protocol. |
| G Address | address | | | | | | | | Graphics multicast IP address | The multicast or unicast IP address used for the graphics stream. |
| G Port | port | | | | | | | | Graphics multicast port | The multicast or unicast IP port used for the graphics stream. |
| G Scope | scope | | | admin | | | | | Graphics multicast scope | The type of multicast scoping used. Scope defines the range or boundaries of multicast packet transmission. |
| G TTL | ttl | 1 | 255 | | ttl | | | | Graphics TTL | The IP protocol "time-to-live" field, defines packet lifetime hop count. |
| G Primary | address | | | | | | | | Graphics primary media stream IP address | Specifies the IP address of the source media stream which will be rendered on the primary graphics display. Normally set by the floor control function of the conference control protocol, but can also be manually preset for a given IP address. |
| G Secondary | address | | | | | | | | Graphics secondary media stream IP address | Specifies the IP address of the source media stream which will be rendered on the secondary graphics display. Normally set by the floor control function of the conference control protocol, but can also be manually preset for a given IP address. |

FIG. 4C

| Variable | Category | Min | Max | Option A | Option B | Option C | Option D | Option E | Description | Notes |
|---|---|---|---|---|---|---|---|---|---|---|
| C Address | address | | | | | | | | Conference multicast IP address | The multicast or unicast IP address used for conference control. |
| C Port | port | | | | | | | | Conference multicast port | The multicast or unicast IP port used for conference control. |
| C Scope | scope | | | admin | ttl | | | | Conference multicast scope | The type of multicast scoping used. Scope defines the range or boundaries of multicast packet transmission. |
| C TTL | ttl | 1 | 255 | | | | | | Conference TTL | The IP protocol "time-to-live" field, defines packet lifetime hop count. |
| S Address | address | | | | | | | | Source IP address (headend) | The IP address of the headend source or reflector terminal which will rebroadcast media streams from this terminal. |
| S Video Port | port | | | | | | | | Source Video Port | The port on which the headend source or reflector terminal receives video packets. |
| S Audio Port | port | | | | | | | | Source Audio Port | The port on which the headend source or reflector terminal receives audio packets. |
| S SAP Audio Port | port | | | | | | | | Source SAP Audio Port | The port on which the headend source or reflector terminal receives second audio program packets. |
| S Graphics Port | port | | | | | | | | Source Graphics Port | The port on which the headend source or reflector terminal receives graphics packets. |
| S Type | protocol | | | udp | tcp | ipm | | | Source Protocol Type | The type of protocol to use in transmitting to the headend source or reflector terminal: UDP, TCP, or Multicast. |

FIG. 4D

VIDEOCONFERENCING SYSTEM

RELATED APPLICATION

This application claims priority to Provisional Application No. 60/183,916, which was filed on Feb. 22, 2000.

TECHNICAL FIELD

This invention relates to videoconferencing, and more specifically, to an improved technique of implementing a multicast videoconferencing system.

BACKGROUND OF THE INVENTION

Videoconferencing and streaming media systems for use over data networks are known in the art. A variety of techniques for implementing such a conference have been published and in use for at least a decade.

One "brute force" manner in which a videoconference may be implemented over a data network involves the broadcasting of packets in multiple copies to all other conferees. Specifically, each member of a videoconference that converts the information into the packets, may duplicate the packets and transmit them over to the data network, with each copy of the packet containing a separate one of the other conferee's addresses. In this manner, each packet produced is transmitted plural times, to different addresses.

An inefficiency with the foregoing is that much of the network bandwidth is wasted. The foregoing method does not take advantage of the fact that a single version of the packet could be sent partially through the network, where it may be split and sent to plural recipients. Additionally, processing power in each transmitting terminal is wasted, since each terminal must duplicate the same packet plural times.

A proposed solution to the foregoing system was developed during the 1990s by an Internet standards group and is termed "Multicast." In multicast technology, a single copy of the packet traverses the data network until the last possible point where it may be replicated and still reach plural recipients. The packet is then replicated at that point. An example, with respect to FIG. 1, will help clarify. Consider a multicast packet originating at node 106 which is destined for both node 102 and 101. Multicast technology might employ a routing algorithm that routes the packet from 106 to 110, and from 110 to 108. However, the routing algorithm at node 108 would recognize the packet as a multicast packet, duplicate it, and transmit copies to each of nodes 101 and 102. Thus, while the packet must be replicated, it is transported as one packet for as long as possible until being copied to produce two or more packets.

It will be recognized by those of skill in the art that the above technique requires a specialized set of addresses to perform multicast conferencing. More specifically, it can be appreciated that the network 100 needs to be capable of routing packets in a conventional fashion from one node to the next when multicast packets are not at issue. Thus, with respect to conventional packet switching, each of the nodes in network 100 must be capable of examining a packet, performing a table lookup to determine the next node to which such packet should be routed, and sending the packet. With respect to multicast technology, each node must be capable of recognizing the address as a multicast address and duplicating the packet in a manner such that copies of the packet get routed to the next node on their way to various conference participants.

Further complicating the situation is the fact that the conference participants in any conference change on a dynamic basis. Thus, a particular multicast address may be utilized to identify a first conference at a first time, and a second conference at a second time. Each multicast address represents all of the conference participants and the nodes are programmed such that any packet with the multicast address is appropriately treated, duplicated where necessary, and sent to plural recipients.

Another problem with the foregoing is the fact that the multicast addresses are dynamic. More specifically, typically a band of addresses are reserved for multicast conferences. When a conference is desired to be started, the originator of the conference would randomly pick one of the band of addresses reserved for multicast. This band of addresses is referred to as Class D addresses.

To initiate the conference once the address is picked, a specialized software tool called a session directory ("SDR") must announce to other network nodes that the session is to be on the particular random Class D address chosen. Users desirous of joining the conference must then attempt to configure in a manner to participate.

If a particular user's workstation is not turned on at the time that the announcement of the conference is made from the originating terminal's SDR, then the terminal, when later turned on, will have no information regarding the videoconference. Since the originating SDR would typically only repeat the conference information in 10-20 minute intervals, it could be a significant amount of time before a user knew what conferences were proceeding. Moreover, the entire process involves random dynamic addresses, software tools such as SDR, directories, and a variety of other complex software tools and files. In short, the system was complicated and cumbersome.

A slight improvement occurred in the late 1990s. A certain subset of the Class D addresses were declared to have special properties and were defined as being applicable in specified geographic areas. Since the specified geographic area may include, for example, a community of interest such as a particular corporation, or set of buildings, there is little chance of conflict among users competing for the same Class D addresses. Thus, it became possible to permanently assign certain administratively scoped addresses for specific multicast use.

The foregoing system does not take advantage of the full capability of such administratively scoped addresses. Accordingly, there exists a need in the art for a technique of performing multicast which permits flexibility and ease of use in multicast systems, and specifically, in the use of administratively scoped multicast systems.

SUMMARY OF THE INVENTION

The above and other problems of the prior art are overcome and a technical advance is achieved in accordance with the present invention. A multicast terminal is disclosed which may utilize prior art techniques of the type that reserve for conferences dynamic Class D addresses. However, the terminal also operates using certain specified permanent multicast addresses, and they are reserved for certain communities of interest. The permanent multicast address is defined as a permanent multicast channel, wherein each such channel includes a plurality of subchannels. Each subchannel may comprise a particular aspect of the channel. Thus, for example, a channel may include, in one simple example, three subchannels, one for audio, one for video, and one for graphics. Each channel comprises plural parameters, up to 63 in the exemplary embodiment, and some or all of the parameters may be subchannels.

Each of the channels may be referred to by name and may have a specific icon. Users can log on to particular multicast channels when desired, and a network administrator may change one or more parameters associated with the channel remotely.

In operation, the conferencing interface utilized by a terminal may load in conventional Class D channels or permanent multicast channels for operation. Thus, the terminal may interface with conventional Class D multicast systems, or with systems that utilize permanent multicast. In a preferred embodiment, some of the channels may include variable parameters, even though the channel itself is a permanently assigned multicast channel.

DETAILED DESCRIPTION OF THE PREFERRED EMBODIMENT

Figure 1:
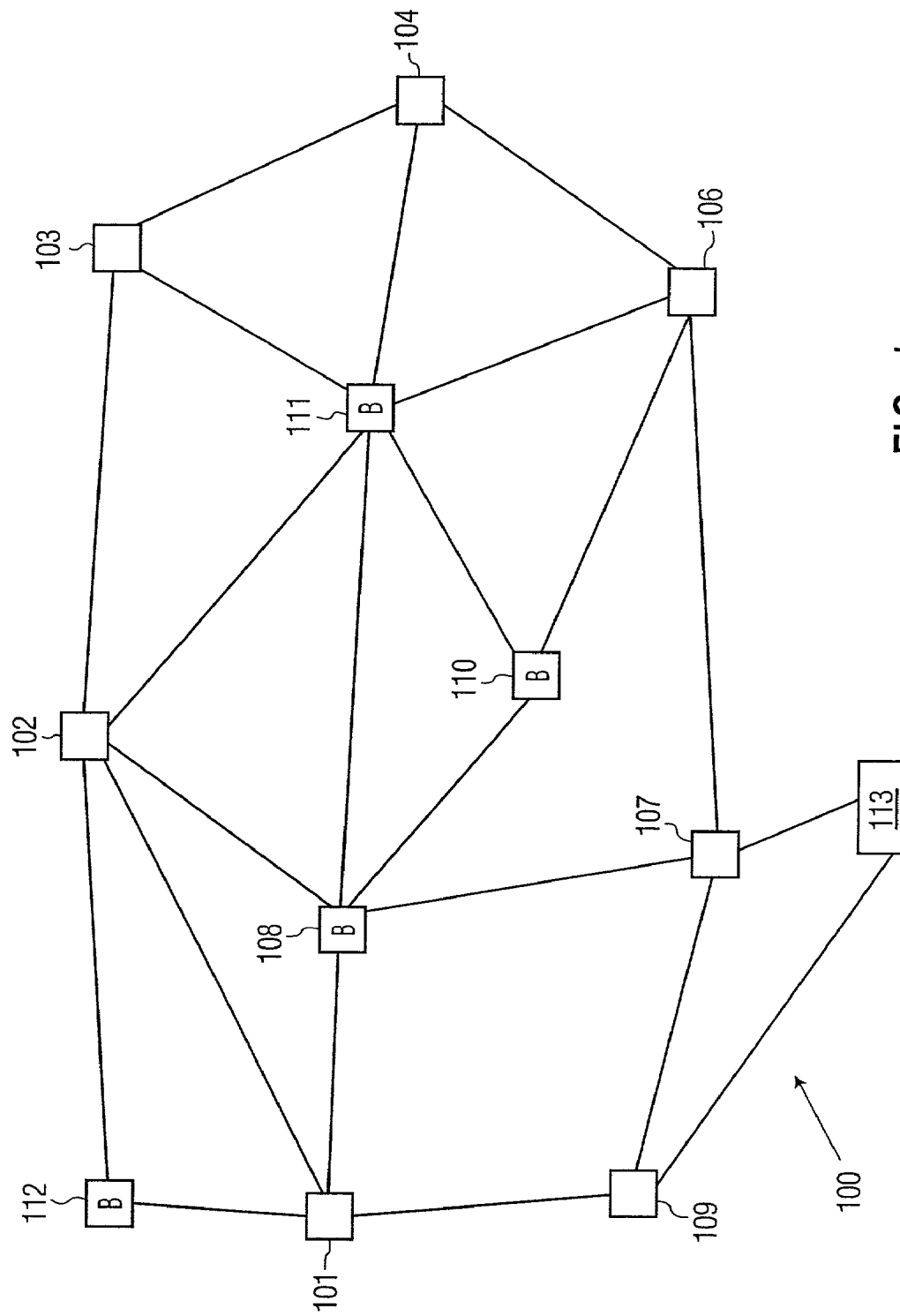
FIG. 1 shows a conceptual diagram of a data network architecture for use in implementing the present invention.

FIG. 1 depicts a plurality of nodes (e.g. terminals) interconnected together via a network 100. The network contains plural links connecting the nodes, and multicast conferences may be desired between any of the nodes.

Some of the nodes may require multicasting on a relatively permanent basis. For explanation purposes herein, we presume that in addition to general multicasting capabilities, nodes 104, 110, and 112 may be required to periodically and substantially permanently participate in multicast conferences. Such a need may arise for example, in a corporation where nodes 104, 110 and 112 represent the computer assigned to the members of the board of directors, and the multicast permanent addresses might be deemed "the board address". One of the nodes of FIG. 1 may be a supervisory administrative node, which is designated 113 in FIG. 1.

When it is desirable to assemble a group of users into a permanent multicast channel, the administrator operating terminal 113 determines who the members of such channel should be. For explanation purposes, we assume that the administrator at terminal 113 determines that terminals 104, 110 and 112 should all be members of "the board channel". In accordance with the present invention, the specific record designated as a permanent multicast channel definition record is transmitted from administrator 113 to terminals 104, 110 and 112. The record includes items such as the members of the conference, its name, particular designation, video and coding type and bandwidth, audio encoding type and bandwidth, graphics coding type, and other parameters. A definition of all of the parameters associated with a channel utilized in the prototype constructed of the present invention by the inventors hereof is included as FIG. 4 hereto.

Figure 2:
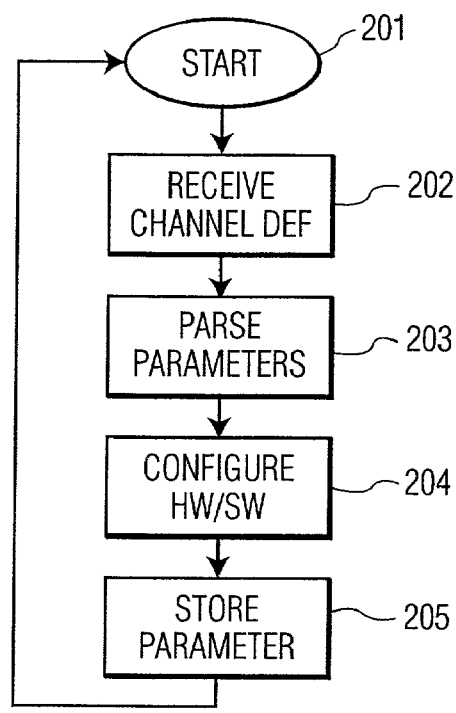
FIG. 2 depicts the basic steps of a flow chart that represents the operation of a terminal installed in a network and implementing an exemplary embodiment of the invention.

FIG. 2 shows a flowchart for implementation at an exemplary terminal 110 for receiving the channel definition record. In operation, the flowchart is entered at start block 201 and the channel definition is received at block 202. Upon receipt, the channel definition record is read into memory. In one exemplary embodiment, the exemplary node 111 may include the database of various definitions. In any event, the information required to define the channel, such as the 63 parameters set forth in FIG. 4 and utilized in the exemplary embodiment, are contained in the channel definition.

In an enhanced embodiment, some of the parameters may be fixed and assigned to the permanent multicast channel, and some may be variable. For example, the channel may have a particular parameter that determines whether a copy of the multicast conference is maintained at a server in the network. This may vary from session to session as the permanent multicast channels are used. Thus, the board of directors may have one multicast conference that they desire to be recorded, and another that they do not. Accordingly, the permanent channel database record may include a field indicative of whether or not the conference gets recorded, with a default value that the conference members may change from session to session. Nonetheless, at least a subset of the conference parameters are permanently assigned to the particular multicast record.

Continuing with FIG. 2, control is transferred to the parse parameters block 203 which reads the numerous fields within the permanent multicast channel record and determines what each of those fields means. The information conveyed is then utilized to determine how to configure hardware and software in order to participate in the particular multicast conference when invoked. Thus, for example, configure block 204 may determine that a specific encoding parameter requires that a specific signal processor be chosen from among several, or that a particular algorithm be utilized for encoding or encrypting the data. In short, configure block 204 translates the information in the permanent multicast channel record received from the administrator node 113 into specific utilization of resources at the receiving node 110. Those parameters are then stored by the receiving node 110 at block 205. The receiving node 110 is then able to participate in any such future permanent multicast conferences by simply invoking the parameters from the storage location utilized by block 205.

Notably, the parameters at block 205 need not be stored locally. More specifically, in the case of receiving terminal 110 being a "thin client" type of terminal, the terminal 110 may store a simple identifier which allows the actual parameters utilized for the permanent multicast conference to be retrieved from a remote server elsewhere in the network. Indeed, it is contemplated that the network could have one remote server which simply stores one large database of all of the permanent multicast parameters which the nodes simply retrieve when necessary.

In still a further embodiment, when a remote database as described above is utilized for storing permanent multicast conference parameters, it may be desirable to have each node store its own parameters in the remote database. This is because the same multicast channel definition record may result in different configuration parameters in each of several terminals.

Figure 3:
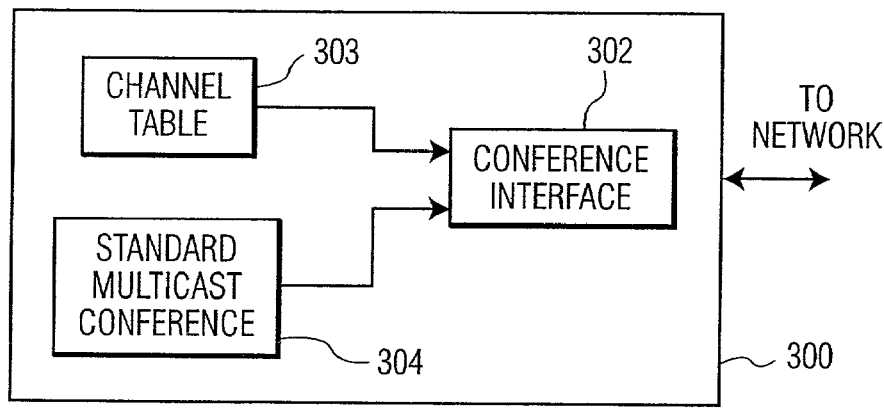
FIG. 3 depicts a functional block diagram of three components of a network node in accordance with the present invention.

The parameters listed in table 4 represent one full record associated with a particular permanent multicast channel. Each of the parameters may represent a subchannel so that a conference terminal desiring to enter a multicast conference taking place on the particular multicast channel would tune in to communicate on 63 different subchannels. Alternatively, the entire set of 63 exemplary parameters may be contained within several predefined subchannels that are associated with the permanent multicast conference. All of the information required to define the permanent multicast channel is contained in what is termed a permanent multicast channel definition records:

FIG. 3 shows three basic functional blocks of an exemplary node 111 required to participate in multicast conferences in accordance with an exemplary embodiment of the invention. Conferencing interface 302 is all of the image compression, encoding and decoding digital signal processing required to implement the videoconference. The specific type of such algorithms utilized is not critical to the present invention. The channel table 303 stores the parameters for using various permanent multicast channels, as the table is utilized by store parameter block 205 of FIG. 2. The channel table may include a plurality of permanent multicast channel definition records, each of which includes plural fields, some of which may be variable as discussed above.

The arrangement of FIG. 3 also includes a standard multicast conference block 304, which includes the algorithms for the Class D multicast addresses previously discussed. In accordance with the inventive technique, the conference interface may use standard SDR techniques to acquire the multicast conference parameters if the parameters are not stored in channel table 303.

When the user selects a particular conference, the terminal 300 will preferably first check the channel table 303 to determine if the desired conferences are part of the permanent multicast channel table 303. If so, the appropriate parameters are loaded into conferencing interface 302. If any such parameters are variable, then the specific values of such variable parameters may be received from an administrator, or may be exchanged with other conference members.

In still another embodiment, one of the subchannels associated with the permanent multicast channel may be reserved for the fixed parameters. Thus, if a permanent multicast channel includes the 63 exemplary parameters set forth in FIG. 4, such permanent multicast address may be included in only thirty subchannels, for example. Several of the thirty subchannels may include plural ones of the parameters set forth in FIG. 4, and other subchannels may only include one such parameter.

In accordance with the foregoing, a user's computer may contain plural "icons" that each represent a stored set of parameters from a permanent multicast address. By clicking on such an icon, a user can become a member of such a conference. The stored record that contains the parameters for the conference is loaded into memory, and the terminal is "tuned" for that conference. The selection of the icon on the part of the user causes two events to occur. First, the appropriate subchannels of the permanent multicast channel are loaded so that the terminal may participate in communications. Second, information on the subchannels is used to set appropriate parameters for the conference (e.g. encoding method).

With respect to the foregoing scenario, if the conference also includes variable parameters, the variable parameter portions of the stored record may not be adapted for the particular conference. Such parameters may be conveyed using a variety of techniques that can be implemented by an ordinarily skilled programmer. For example, the parameters may be requested from another member of the conference. Alternatively, the conference channel itself may be set up such that all variable parameters are on one of the subchannels. Thus, the conference channel actually comprises plural subchannels, one of which is immediately read when the user joins the conference in order to ascertain the values of the variable parameters.

Figure 4:
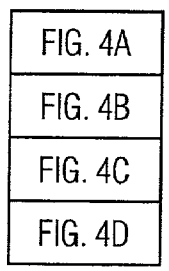
FIG. 4 represents an exemplary table for defining a "channel" as discussed with respect to the present invention.

Although the exemplary permanent multicast channel definition shown in FIG. 4 does not designate which parameters are permanent and which may vary, numerous ones of such parameters may be varied from session to session. For example, the "G state" variable may enable or disable the graphics channel, as described in FIG. 4. Although a particular graphics subchannel may be permanently assigned to a permanent multicast channel as that multicast channel graphics subchannel, the parameter "G state" may take on a different value from one session to another. Thus, a user joining a conference may immediately obtain the variable parameters by looking on a specific subchannel that defines the values of the variable parameters of that particular permanently assigned multicast channel.

The parameters to be specified with the permanent multicast channel may include the identity of the terminal given transmission rights to the exclusion of all others at a particular time, or may include any other information for arbitrating access among participants, including speaking order, order of video transmission, etc. For example, the permanent multicast record may include a definition of which video stream should be displayed at the video interface of each conference participant, or the maximum bandwidth permitted to be utilized by any media stream leaving a terminal of a conference participant. Such information may not only be prestored in the permanent multicast record, but may be dynamically changed at the time of the conference, or even during the conference, through the use of a control subchannel or via commands sent from a conference participant and entered via any convenient method such as icons, a web page, a remote control, etc.

The media stream accessed by a user may be toggled or switched between various subchannels. For example, a user may switch between video, data, or graphics to be displayed by utilizing a remote control that selects which subchannel is to be displayed. In still another embodiment, the commands to configure a terminal to join a conference may be sent from a remote computer terminal, server, or through a Web page. In one enhanced embodiment, a remote server is programmed to set up the conference by timing. For example, a remote server may invoke the conference at a specified time by transmitting the appropriate information to plural terminals in order to cause the plural terminals to configure themselves to use a particular channel at a particular time. In this manner, all of the conferences in the network may be controlled by a central administrative server, that simply sends out commands to various terminals at programmed times to invoke plural conferences as defined by an administrator. Alternatively, the "timed tuning" can be implemented locally at any one or more specific terminals.

In still another embodiment, users are provided with "smart cards" or other similar device that may hold identification and authorization information for one or more of the channels available. Such a technique provides a manner in which channels can be restricted, monitored, or even revenue generating. For example, each user may be given a smart card that they use with a card reader attached to a terminal. Upon swiping the card, a password may be required, after which channel authorization is given, the terminal invokes the appropriate parameters and subchannels, and allows the user to join a multicast conference on such channel. A record may be maintained that indicates the time spent on the conference, user number, etc. Such record is transmitted to a billing database, which may process the record and generate a bill in a manner determined by the designer of such a billing system.

Notably, the smart card itself may contain the parameters for the conference, which can then be utilized to supplement the stored table. Conferences may be joined by utilizing the parameters on the smart card, or by utilizing the parameters stored in the table. The table could be updated via use of the smart card.

Other possibilities for configuring any one or more terminals to join the conference may be implemented either in the terminals or elsewhere in the multicast communications system. For example, the terminal may include a simple remote controller, utilizing infra red technology similar to a television remote control, for moving between channels. Each terminal may have specified channel parameters loaded into its boot software, so that upon bootup, the terminal immediately goes to a specified default channel. Such a channel could be where important company messages are posted, so that each user would have such information as soon as they turn on their computer or other type of terminal.

In another embodiment, a channel coordinator is designated to issue control commands for the conference. The coordinator may be assigned as such upon boot up, and any other terminals that choose to select a channel that already has a coordinator assigned to it become participants in any conference taking place on that channel, subject to security controls and authentication. A conference coordinator may be employed in any of the described embodiments.

Certain channel parameters may be set and controlled from a Coordinator, a specified terminal or other device responsible for broadcasting various parameters, SDR announcements, and other items relevant to the conferences taking place. This allows a conference to be controlled by a coordinator. Any terminal providing broadcast announcements when joining the conference may include a delay means to ensure the user remains on the channel before providing the announcements. In this manner, random announcement due to "surfing" plural channels may be avoided.

In more general embodiments, the media stream need not include video, but could instead include only one or more audio streams, or other media streams.

While the above describes the preferred embodiment, various modifications and/or additions will be apparent to those of ordinary skill in the art. Such modifications are intended to be covered by the following claims.

What is claimed is:

1. A method for a conference terminal to participate in a multicast conference, said method comprising receiving parameters to specify audio, video and control subchannels from a remote terminal, storing said parameters, generating an icon to correspond to said parameters, receiving a user selection of said icon, and in response to said selection, determining other parameters associated with said conference by receiving information on at least one of said audio, video, or control subchannels, and participating in the conference by configuring parameters of the conference terminal based upon prestored parameters and parameters received on a subchannel specified as one of said prestored parameters.

2. The method of claim 1 wherein said at least one of said subchannels is the control subchannel.

3. The method of claim of claim 2 wherein at least one of said subchannels contains plural parameters for use in participating in a multicast conference.

4. The method of claim 1 wherein each terminal participating in the multicast conference includes a database of permanent multicast conference records.

5. The method of claim 4 wherein at least one field in each said conference record includes an identifier of a subchannel and at least another field includes at least one parameter utilized to configure each said terminal to conduct communication during said conference.

6. The method of claim 1 wherein at least some of said parameters are permanently associated with said icon, and wherein at least one other said parameter varies in accordance with characteristics of one or more other conferences.

7. The method of claim 1 wherein the step of receiving parameters comprises: loading permanent multicast parameters from a stored table.

8. The method of claim 1 wherein the step of receiving parameters comprises: loading temporary multicast parameters received from said remote terminal.

9. The method of claim 1 wherein the step of receiving the parameters comprises accessing a remotely located storage medium over a data network.

10. The method of claim 1 further comprising:
receiving commands, at the conference terminal, from a remote server running scheduling software for the purpose of implementing the multicast conference.

11. The method of claim 1 further comprising:
sending commands to the conference terminal from a Web page.

12. The method of claim 1 further comprising:
the conference terminal announcing, to other terminals participating in the multicast conference, various parameters of the conference.

13. The method of claim 1 further comprising:
receiving authentication information from prospective conference participants prior to allowing access to the conference by the prospective participants.

14. The method of claim 1 wherein the parameters include an identification of specific conference participants, which identification implements arbitration control among conference participants.

15. The method of claim 1 wherein said parameters vary dynamically during the conference.

* * * * *